(12) United States Patent
Liao (10) Patent No.: US 6,439,491 B1
(45) Date of Patent: Aug. 27, 2002

(54) WIRE WINDING BOX

(76) Inventor: Sheng Hsin Liao, No. 10, Alley 38, Lane 229, San Chun St., Shulin, Taipei Hsien (TW)

( * ) Notice: Subject to any disclaimer, the term of this patent is extended or adjusted under 35 U.S.C. 154(b) by 0 days.

(21) Appl. No.: 09/737,576

(22) Filed: Dec. 18, 2000

(51) Int. Cl.$^7$ ................................................ B65H 75/48
(52) U.S. Cl. .................... 242/378.1; 242/378; 242/376; 242/379
(58) Field of Search .............................. 242/378.1, 378, 242/376, 379

(56) References Cited

U.S. PATENT DOCUMENTS 2,526,256 A * 10/1950 Mihara
5,094,396 A * 3/1992 Burke ...................... 242/107.1
5,588,626 A * 12/1996 Yang ........................ 242/378.1

* cited by examiner

*Primary Examiner*—Donald P. Walsh
*Assistant Examiner*—Jonathan R Miller
(74) *Attorney, Agent, or Firm*—Rosenberg, Klein & Lee (57) ABSTRACT

A wire winding box with an increasing area includes a box body, a housing, a communication cable, a wire winding disk, and a spiral spring. The box body has a wire groove and a shaft. The wire winding disk has a first disk body. Two surfaces of the first disk body are installed with a receiving groove and a wire winding ring. The wire winding disk is placed in the wire groove of the box body. The wire winding disk is pivotally installed to the shaft by an axial hole. The communication cable is further wound around the wire winding ring of the wire winding disk so that the communication cable are installed in the receiving groove and out of the wire winding ring at two surface of the first disk body.

4 Claims, 11 Drawing Sheets

WIRE WINDING BOX

FIELD OF THE INVENTION

The present invention relates to a wire winding box with an increased usable area, and especially to a wire winding box with a communication cable which can be rewound automatically and has a large area for receiving a longer communication cable.

BACKGROUND OF THE INVENTION

Currently, computers, modems, telephones, or facsimile machines are arranged with communication cables for connection to other devices or networks to achieve their objective. In order to avoid an overlong communication cable or an overshort communication cable, various wire winding boxes have been developed. Such a wire winding box basically includes a box body, a communication cable, a wire winding disk, and a spiral spring. The receptacle of the communication cable is inserted into the receptacle of a communication device for downloading data.

However, in the prior art wire winding box, as the communication cable is wound around the wire winding disk, it is confined by the space of the wire winding disk. Furthermore, the segments of the communication cable in the outer portion and inner portion of the wire winding ring are proportional. As the area of the wire winding box is finite, a longer communication cable cannot be received therein, so that the use of the wire winding box is confined.

Therefore, it is appreciated that the prior art wire winding box has some defects that are necessary to improve.

SUMMARY OF THE INVENTION

Accordingly, the primary object of the present invention is to provide a wire winding box with an increased area, wherein the communication cable is placed in the receiving groove on one surface of the first disk body and out of the wire winding ring on another surface of the first disk body. Therefore, as the communication cable is wound around the wire winding disk, the confinement to the communication cable is less. As a result, the application area of the wire winding box is increased so that a communication cable with a longer length can be conveniently received therein.

To achieve those objects, the present invention provides a wire winding box with an increasing area including a box body, a housing, a communication cable, a wire winding disk, and a spiral spring. The box body has a wire groove and a shaft. The shaft is installed at an inner lateral side of the wire groove. A housing is connected to the box body for sealing the wire groove. A wire winding disk has a first disk body. The first disk body has an axial hole. Two surfaces of the first disk body are installed with a receiving groove and a wire winding ring, respectively. The wire winding disk is placed in the wire groove in the box body, and the shaft extends through the axial hole. A communication cable is wound around the shaft, and is in the receiving groove of the wire winding ring of the wire winding disk, so that the communication cable is placed in the receiving groove formed on one surface of the first disk body and on the wire winding ring formed on another surface of the first disk body. A spiral spring is connected between the box body and the wire winding disk. Thereby, a wire winding box with an increasing area is formed.

The various objects and advantages of the present invention will be more readily understood from the following detailed description when read in conjunction with the appended drawings.

DETAILED DESCRIPTION OF THE PREFERRED EMBODIMENTS

Referring to FIGS. 1 to 8, there is shown a wire winding box for increasing the area for receiving cable. The related components in the present invention include a wire winding box body 1, a housing 2, a communication cable 3, a wire winding disk 4, and a spiral spring 6.

Figure 1:
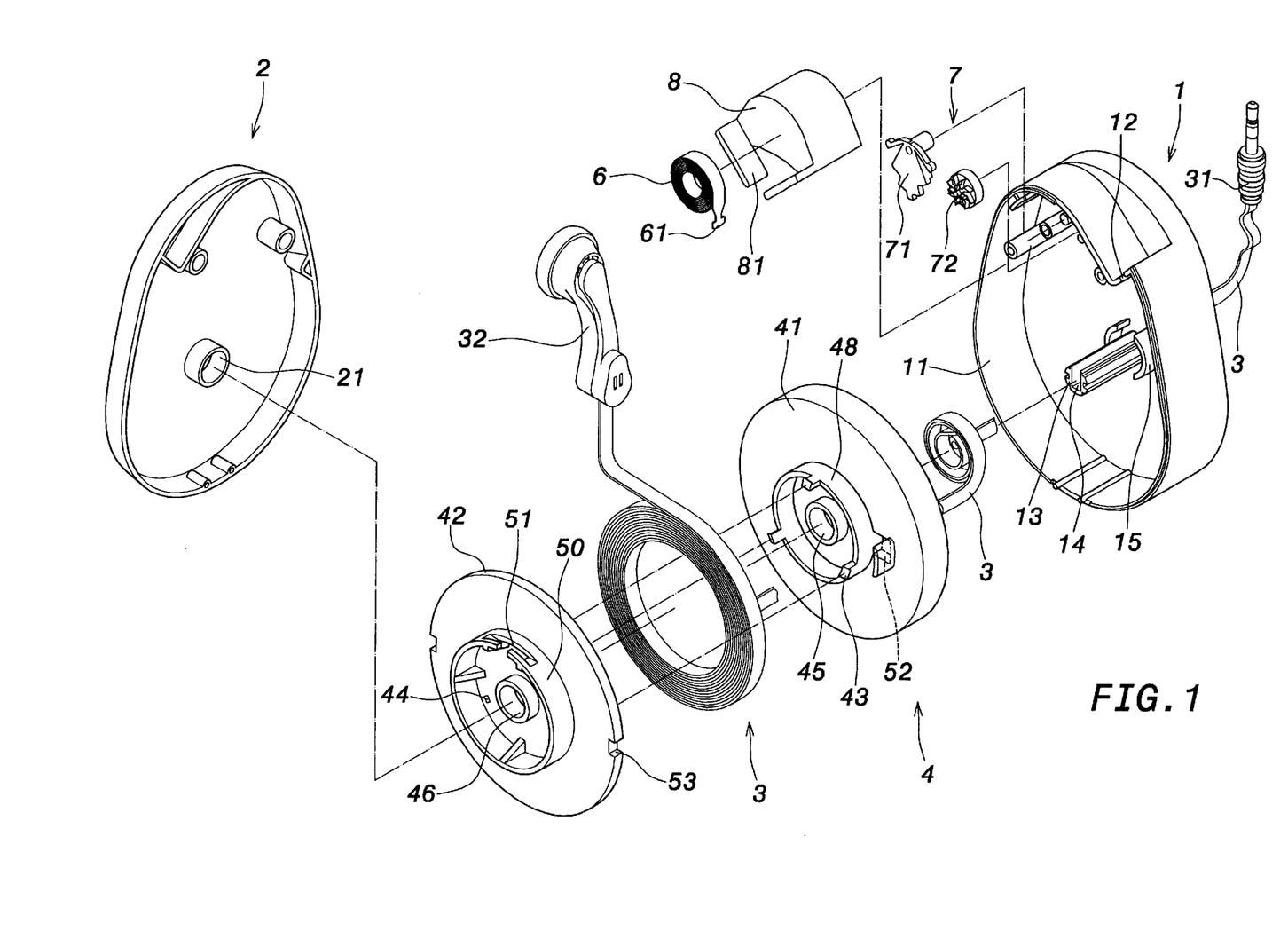
FIG. 1 is an exploded perspective view of the first embodiment of the present invention.

One surface of the box body 1 is installed with a concave wire groove 11 for receiving the communication cable 3. The lateral side of the wire groove 11 is formed with a wire hole 12 for passing the communication cable 3 therethrough. The inner lateral side of the wire groove 11 is installed with a shaft 13. The shaft 13 is formed with an axially extended slot 14 passing through the box body 1. At least one positioning piece 15 is mounted at the periphery of the bottom of the shaft 13. In this embodiment, two positioning pieces 15 are mounted adjacent the bottom of shaft 13. Each positioning piece 15 is an arcuate plate.

The housing 2 can be engaged to one surface of the box body 1 by buckling or screwing for sealing the wire groove 11 and to properly position the communication cable 3, wire winding disk 4, and spiral spring 6 in the box body 1. The housing 2 has a recess 21 for positioning the shaft 13.

Figure 2:
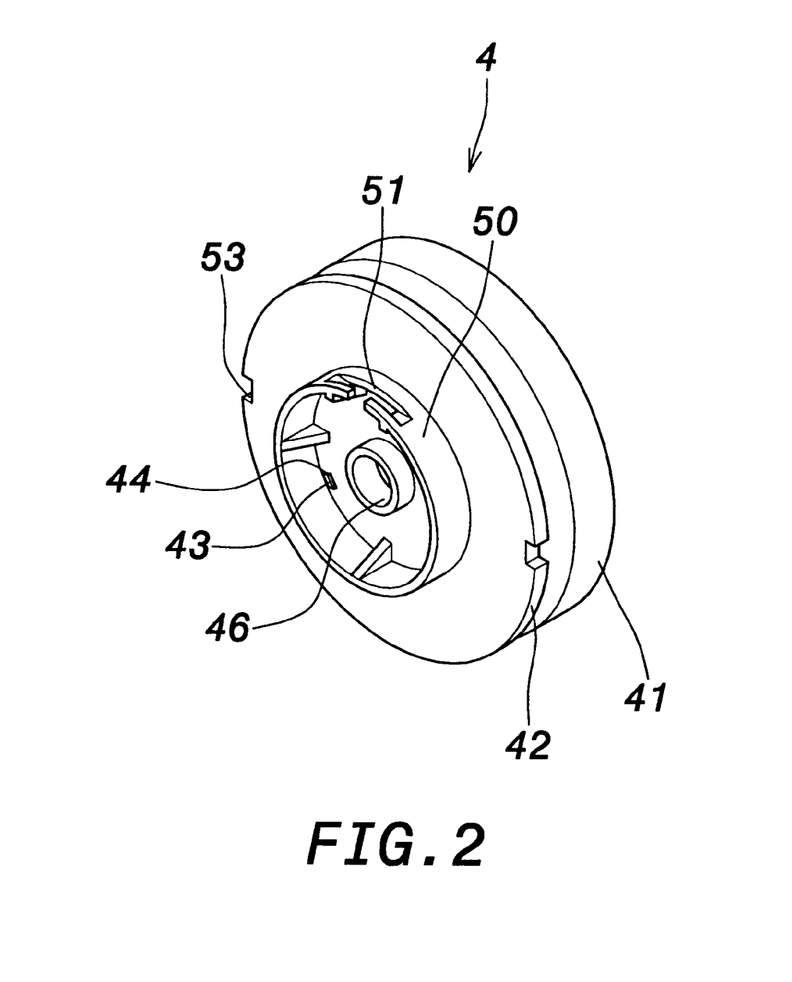
FIG. 2 is a perspective view of the wire winding disk of the first embodiment of the present invention.
Figure 3:
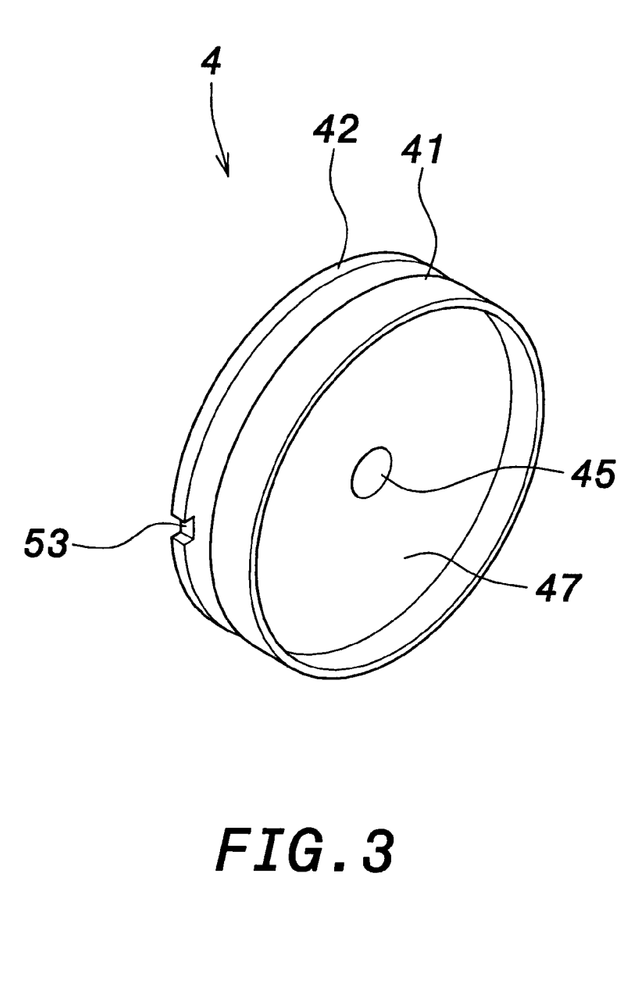
FIG. 3 is another perspective view of the wire winding disk of the first embodiment of the present invention.
Figure 4:
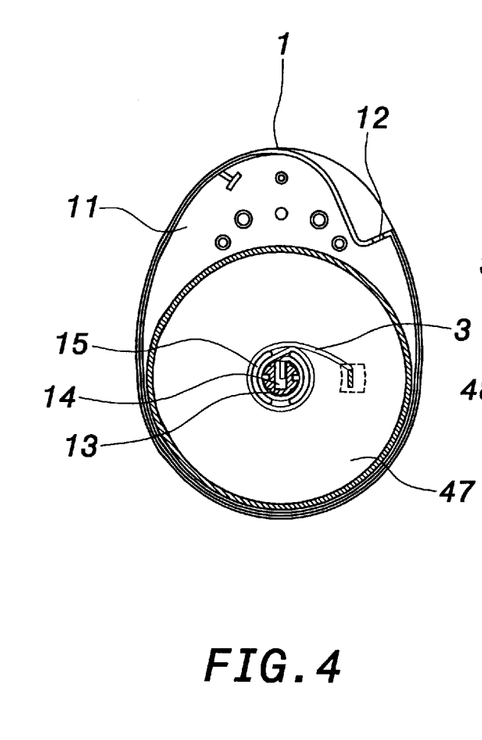
FIG. 4 is a first cross-sectional view of the first embodiment of the present invention.
Figure 5:
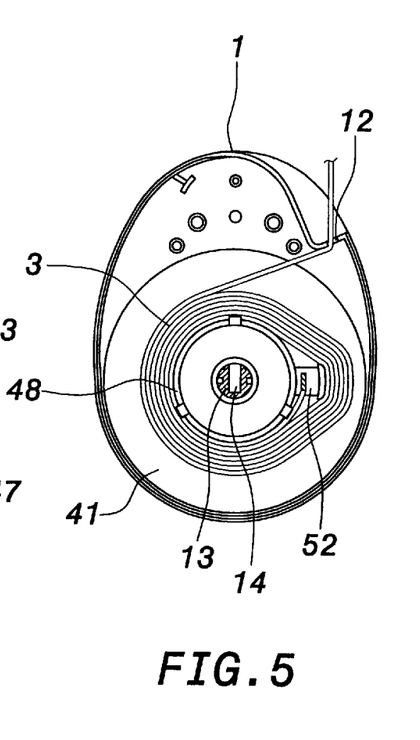
FIG. 5 is a second cross-sectional view of the first embodiment of the present invention.
Figure 6:
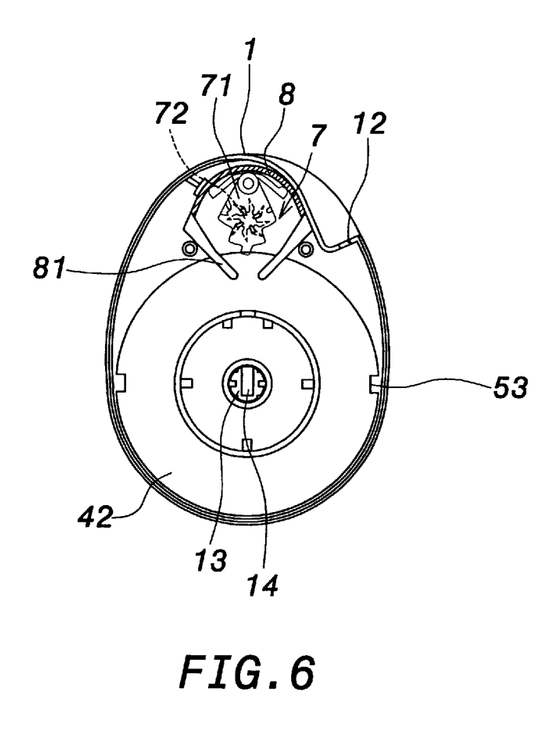
FIG. 6 is a third cross-sectional view of the first embodiment of the present invention.
Figure 7:
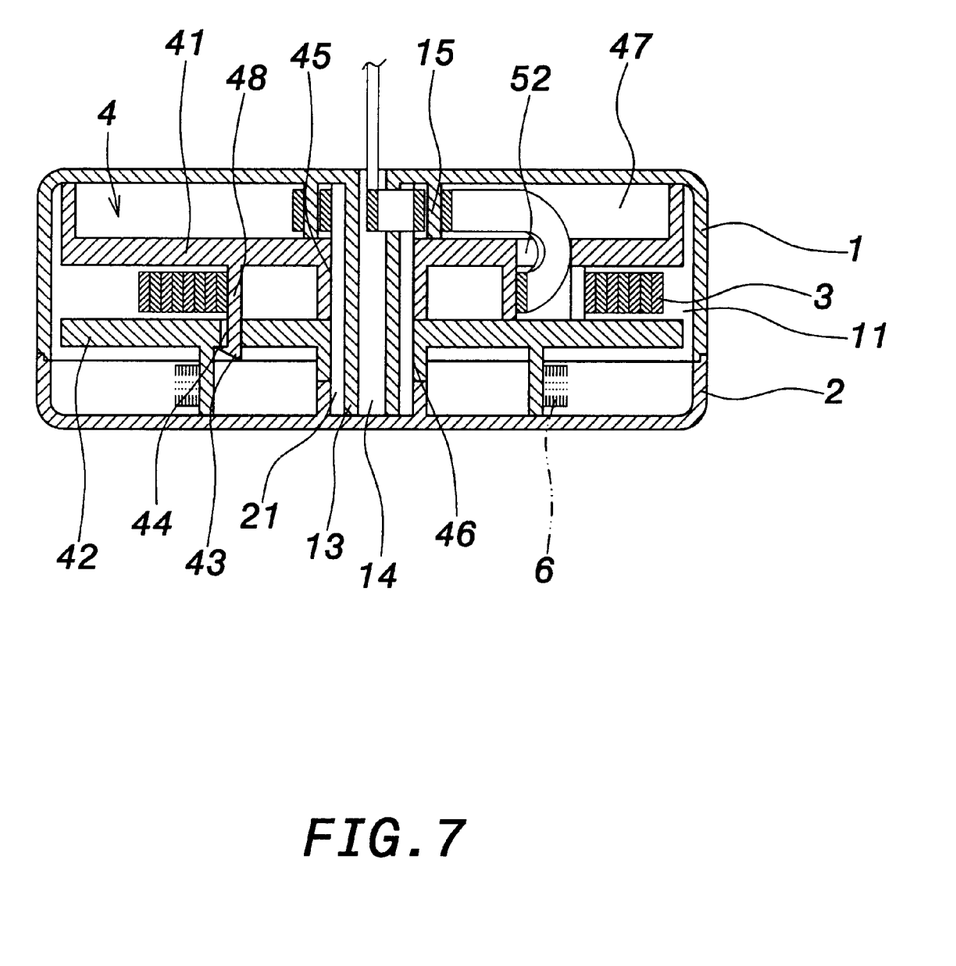
FIG. 7 is a fourth cross-sectional view of the first embodiment of the present invention.

The wire winding disk 4 is formed by a first disk body 41 and a second disk body 42. The two disk bodies 41 and 42 are installed with hooks 43 and buckling holes 44, respectively, the two disk bodies being buckled together thereby. Each of the two disk bodies 41 and 42 is installed with a central axial hole 45,46. Two surfaces, opposing sides, of the first disk body 41 are installed with a receiving groove 47 and a wire winding ring 48, respectively. The second disk body 42 is installed with a spring retaining post 50. The spring retaining post 50 has a buckling hole 51. The wire winding disk 4 is received in the wire groove 11 of the box body 1. The wire winding disk 4 is pivotally installed to the shaft 13, the shaft 13 passing through the axial holes 45 and 46 so that the wire winding disk 4 rotates within the wire groove 11.

Figure 11:
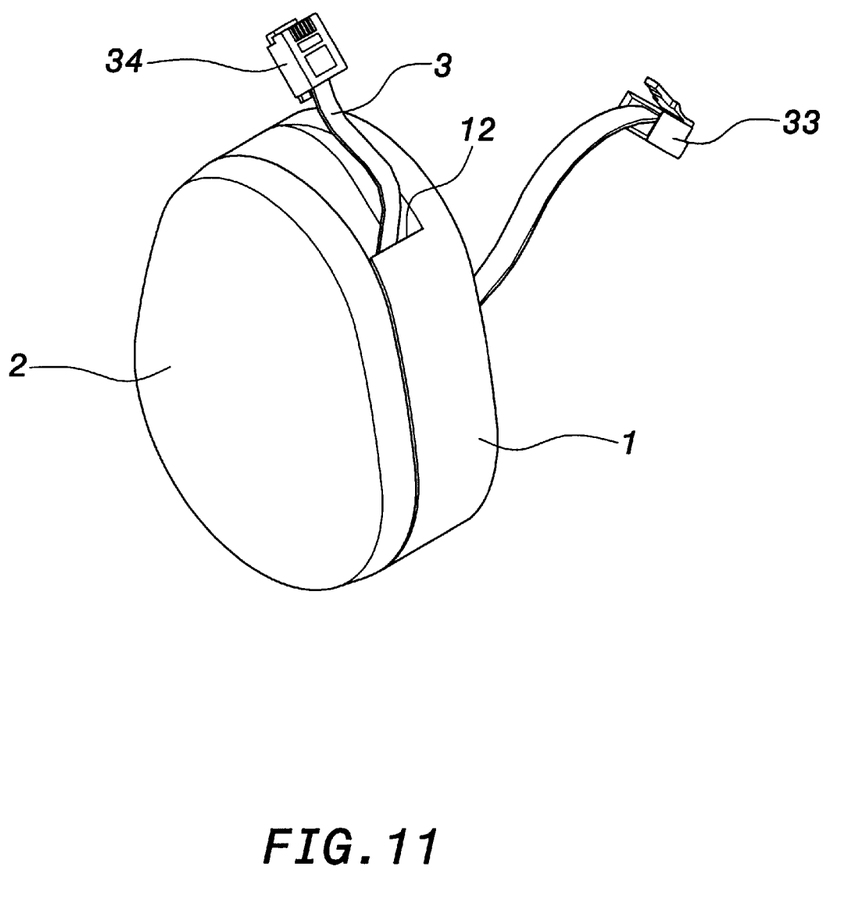
FIG. 11 is an assembled perspective view of the third embodiment of the present invention.

Two ends of the communication cable 3 are mounted with a plug 31 and an earphone 32, respectively. Alternatively, the two ends of the communication cable 3 can be installed with plugs 31 or plugs 33 and 34 (FIG. 11) of other types can be installed at the two ends of the communication cable 3. The communication cable 3 is wound around the wire winding ring 48 of the wire winding disk 4. One end of the communication cable 3 extends from the wire hole 12 of the box body 1. The other end of the communication cable 3 passes through the through hole 52 of the first disk body 41 of the wire winding disk 4 to wind around the shaft 13 in the wire groove 11 and is positioned between the first disk body 41 and the receiving groove 47. Therefore, the communication cable 3 is installed out of the wire winding ring 48 and in receiving groove 47 at two sides of the first disk body 41. The other end of the communication cable 3 extends through the slot 14 of the shaft 13 to pass from the box body 1. As the communication cable 3 passes out from the slot 14, the communication cable 3 can be clamped and positioned between the positioning pieces 15 and the shaft 13.

The spiral spring 6 is properly positioned in the wire groove 11 of the box body 1. The buckle end 61 of the spiral spring 6 is buckled to the buckling hole 51 of the wire winding disk 4 so that the spiral spring 6 is connected to the wire winding disk 4. The spiral spring 6 is also connected to the box body 1, thereby connecting between the wire winding disk 4 and the box body 1. As the wire winding disk 4 rotates, the spiral spring 6 stores energy therein.

Figure 8:
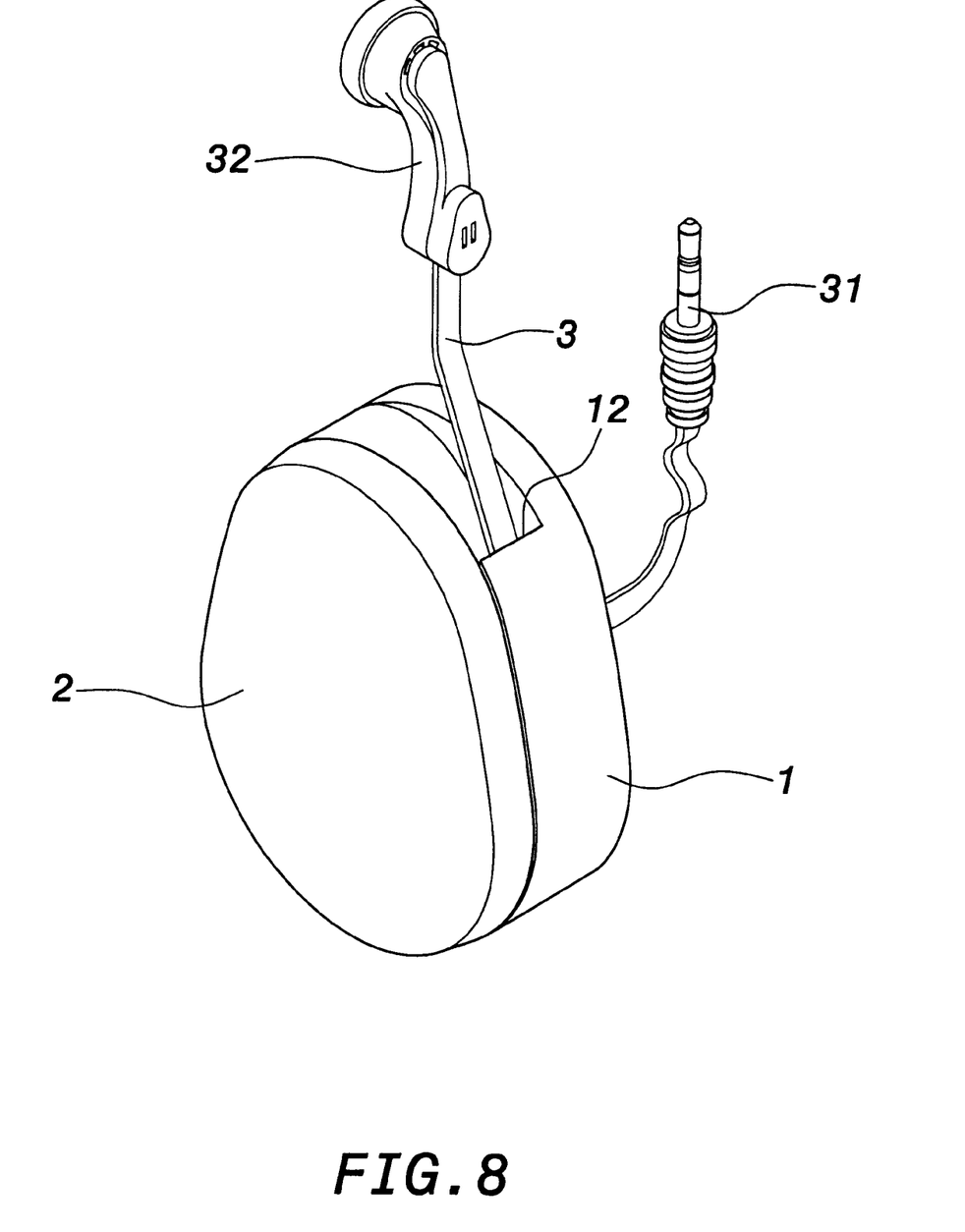
FIG. 8 is an assembled perspective view of the first embodiment of the present invention.

An assembled wire winding box is shown in FIG. 8. In application, the communication cable 3 with a longer length can be wound in the wire winding box and communication cable 3 can be rewound at any time. The user inserts the plug 31 of the communication cable 3 into a communication device for downloading data. Two ends of the communication cable 3 can be pulled out directly from the wire winding box. Furthermore, the two ends of the communication cable 3 are subjected to action of the spiral spring 6 in the box body, and therefore, the cable can be rewound into the box successfully. No wire segment is exposed to become entangled.

A supporting seat 8 is installed in the wire groove 11 of the box body 1. Two sides of the supporting seat 8 respectively have two stops 81 extending therefrom so that the spiral spring 6 can be placed between the stops 81 and the housing 2. In order to avoid the effect of the spring tension as the communication cable 3 is pulled out, the periphery of the second disk body 42 of the wire winding disk 4 is installed with a plurality of buckling grooves 53. A reciprocal control device 7 is installed adjacent to the wire winding disk 4. The reciprocal control device 7 includes a free swingable swinging piece 71 and a free rotated ratchet 72. By the interaction between the swinging piece 71, ratchet 72 and buckling grooves 53 of the wire winding disk 4, the communication cable 3 can be pulled out or rewound reciprocally.

In the present invention, the communication cable 3 is installed in the receiving groove 47 and on the wire winding ring 48, at two opposing sides of the first disk body 41. Therefore, as the communication cable 3 is wound on the wire winding ring 48 of the wire winding disk 4, it is not effected by the receiving groove 47. When the communication cable 3 winds around the wire winding disk 4, the effect of the space in the wire winding disk 4 is small, so that the usable area of the wire winding box is increased greatly and thus, a longer communication cable 3 can be received therein. Thus, the wire winding box can be used conveniently.

Figure 9:
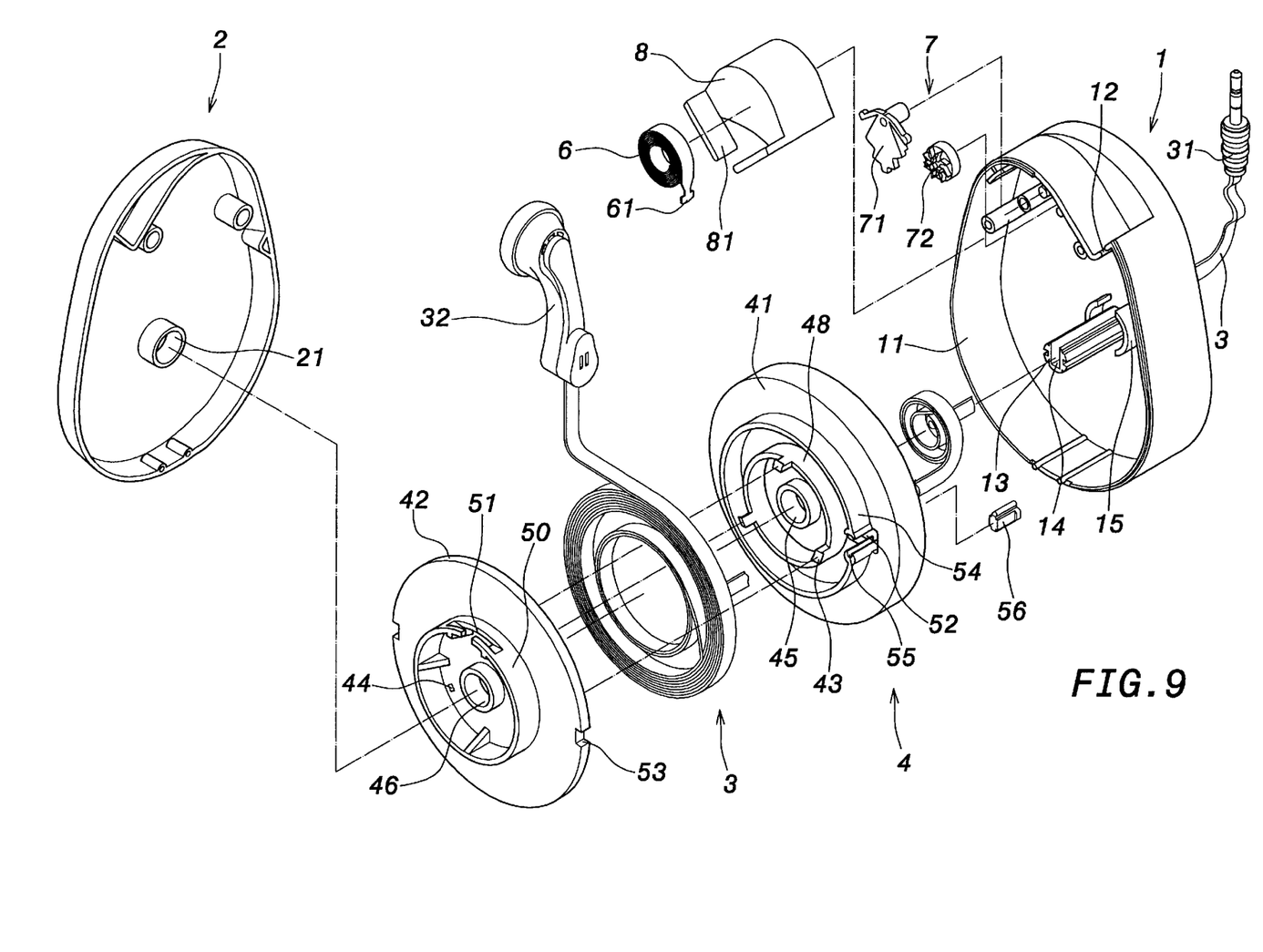
FIG. 9 is an exploded perspective view of the second embodiment of the present invention.
Figure 10:
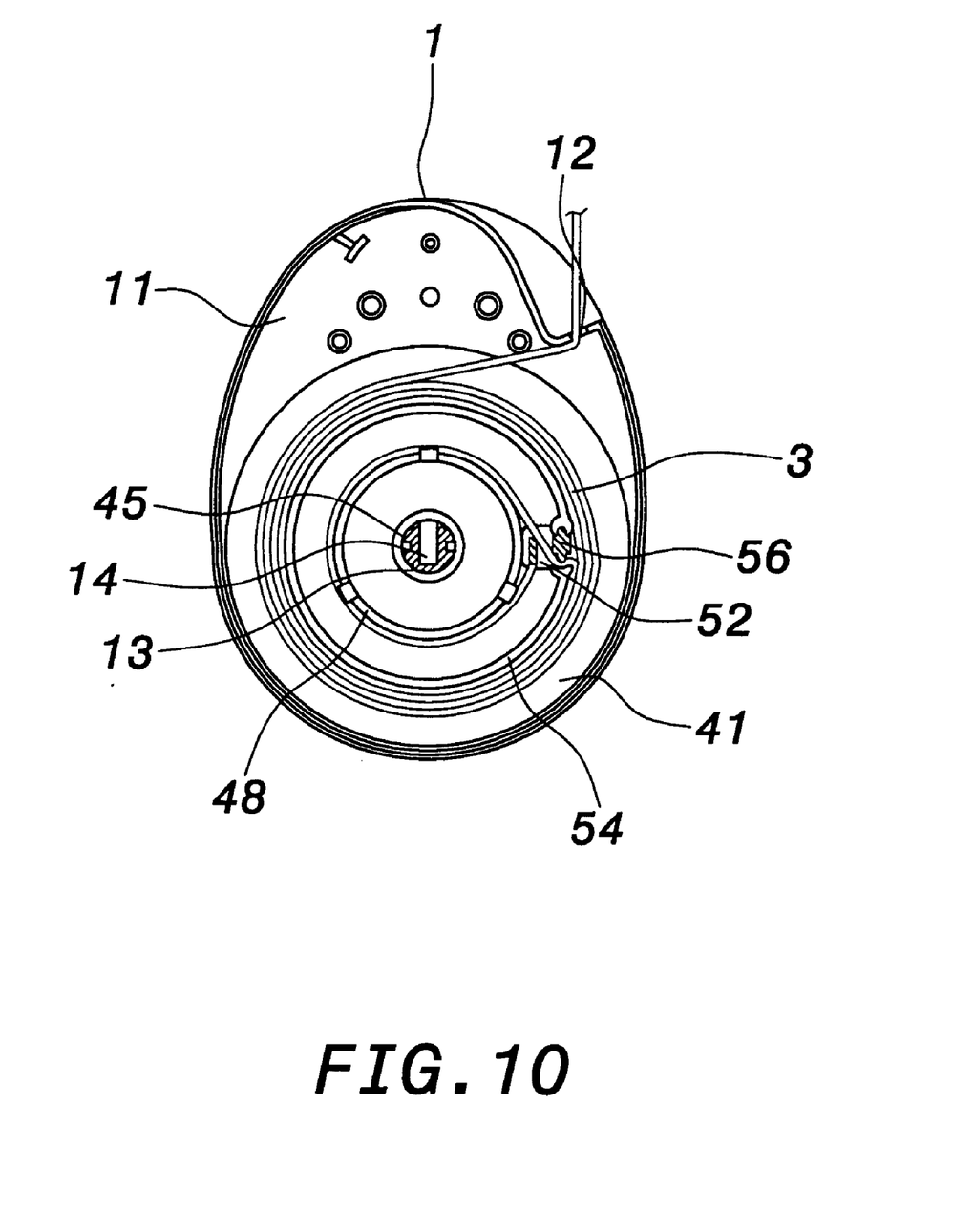
FIG. 10 is a cross-sectional view of the second embodiment of the present invention.

Moreover, with reference to FIGS. 9 and 10, in the present invention, an outer wire winding ring 54 is installed around the wire winding ring 48 with a proper distance therebetween and a via hole 55 is formed on the outer wire winding ring 54. A retaining piece 56 is engaged in the via hole 55 of the outer wire winding ring 54. The retaining piece 56 serves to fix the communication cable 3 passing though the via hole 55 so that the communication cable 3 on the outer wire winding ring 54 is motionless. Therefore, as the communication cable 3 from the outer wire winding ring 54 is pulled inwards, the friction between the different segments of communication cable 3, and between the communication cable 3 and the outer wire winding ring 54 is avoided. As a result, the breakage condition on the surface of the communication cable 3 that harms the inner lead in the communication cable 3 is avoided.

Figure 12:
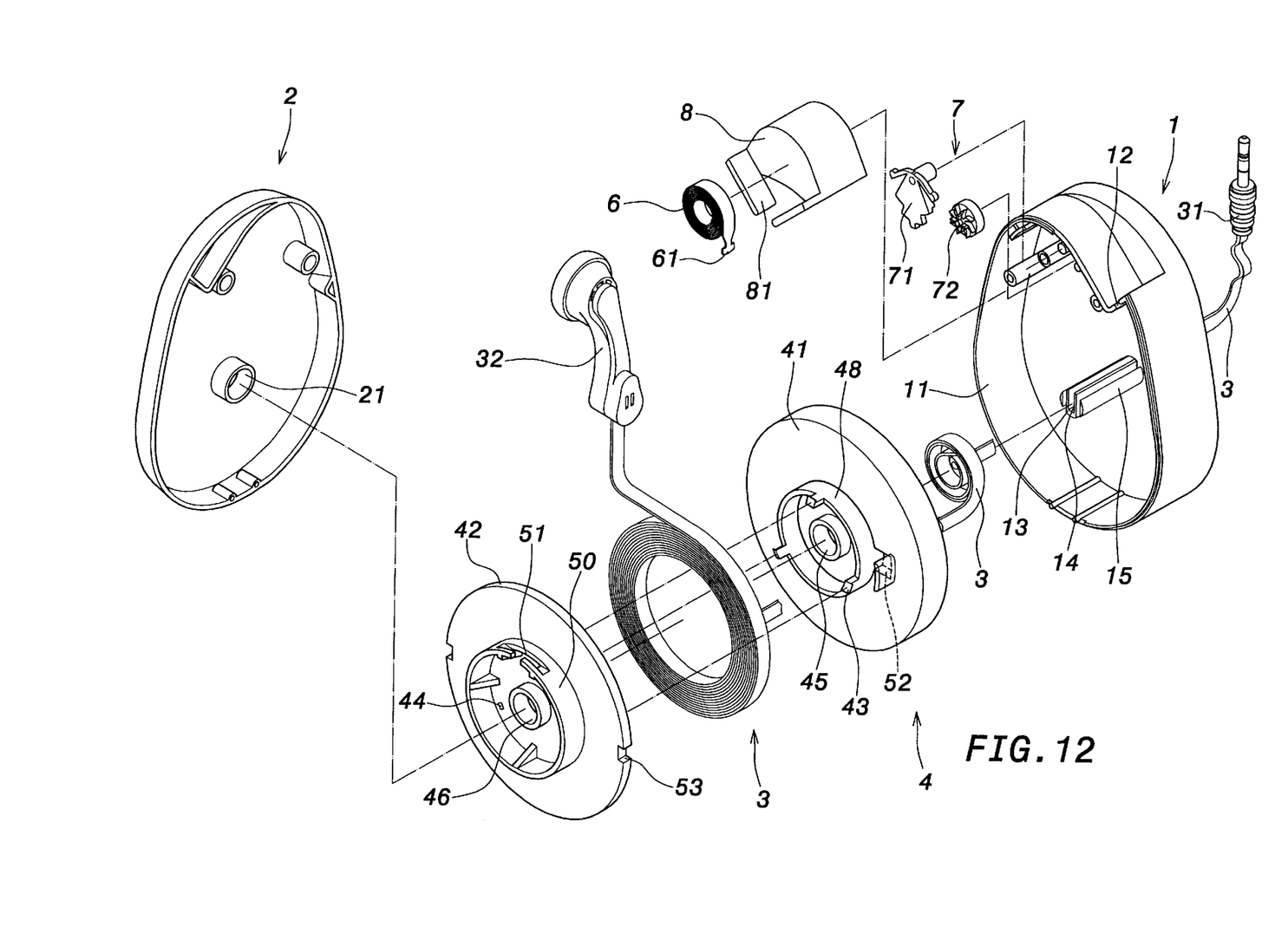
FIG. 12 is an exploded perspective view of the fourth embodiment of the present invention.
Figure 13:
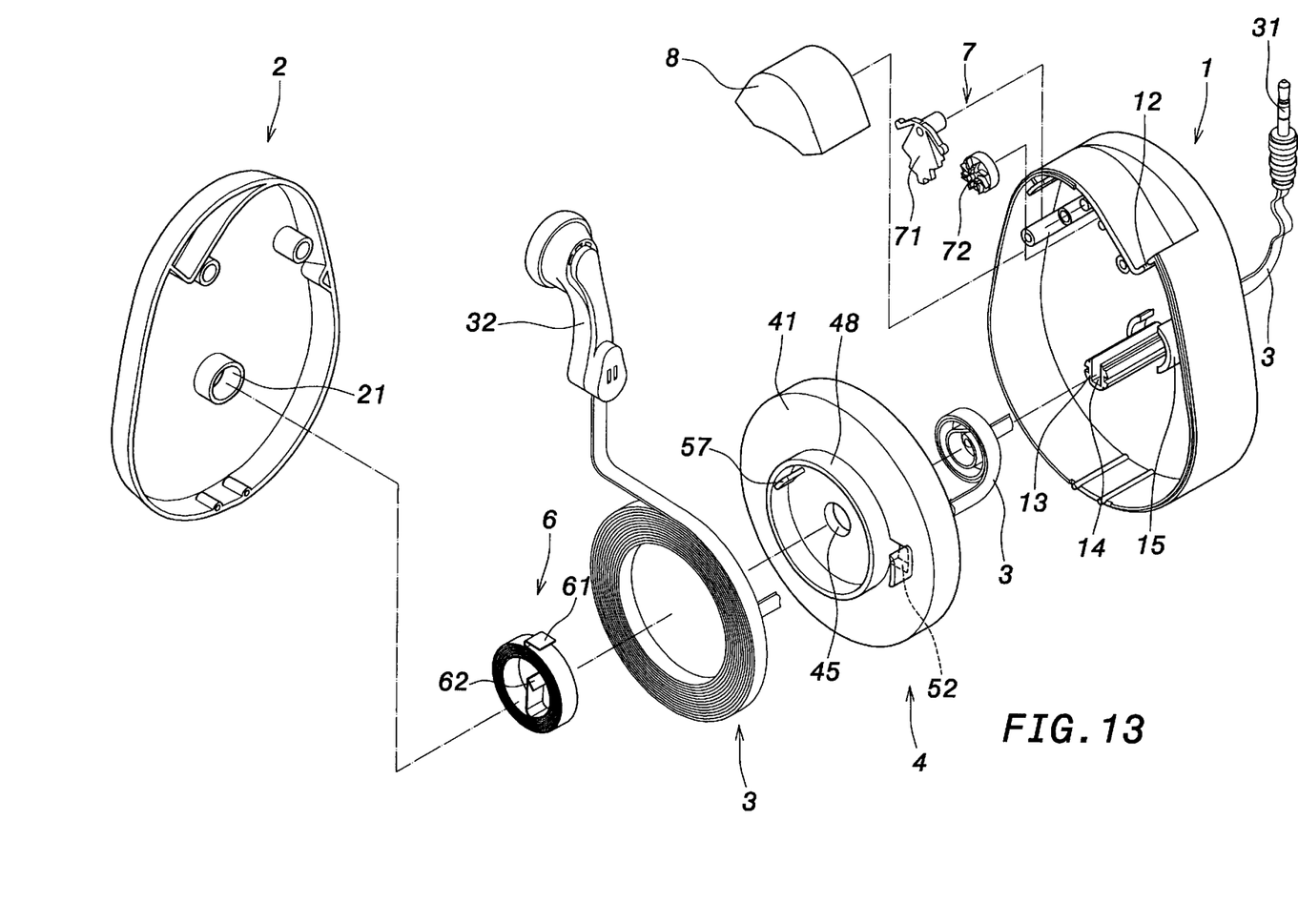
FIG. 13 is an exploded perspective view of the fifth embodiment of the present invention.

With reference to FIG. 12, the positioning pieces 15 are formed by peripheral portions of the shaft 13, and have a height equal to the shaft length. Moreover, referring to FIG. 13, the wire winding disk 4 may have a single first disk body 41. The spiral spring 6 is placed n the wire winding ring 48 of the first disk body 41. The buckle end 61 of the spiral spring 6 is buckled to the buckling block 57 on the first disk body 41 of the wire winding disk 4 so that the spiral spring 6 is connected to the wire winding disk 4. Another buckle end 62 of the spiral spring 6 is buckled to the slot 14 formed in the shaft 13 of the box body 1 so that the spiral spring 6 is connected between the box body 1 and the wire winding disk 4. As the wire winding disk 4 rotates, the spiral spring 6 stores energy.

Figure 14:
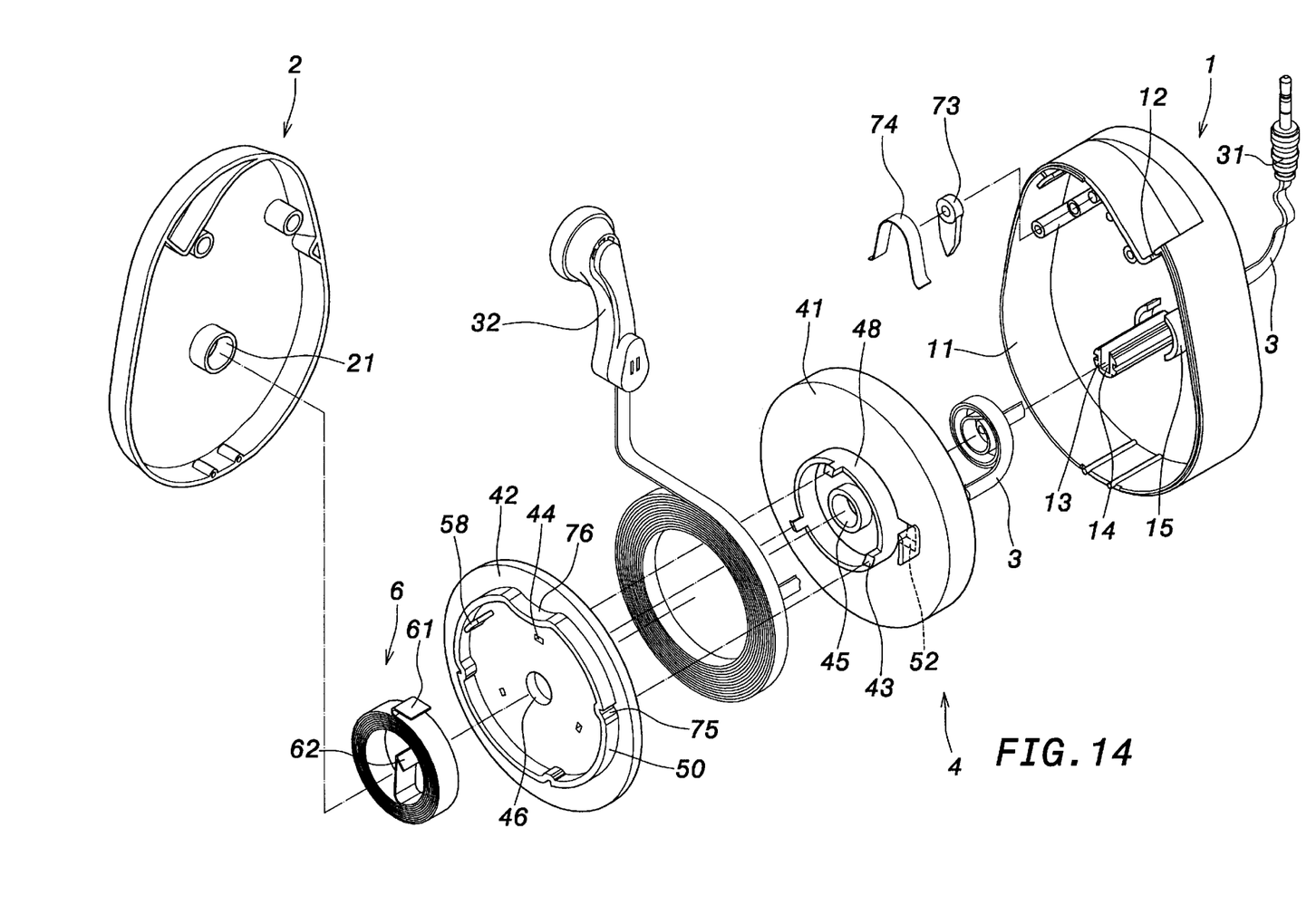
FIG. 14 is an assembled perspective view of the sixth embodiment of the present invention.

Moreover, as shown in FIG. 14, in the present invention, the spiral spring 6 can be placed in the spring retaining post 50 of the second disk body 42. The buckle end 61 of the spiral spring 6 is buckled to a buckling block 58 on the second disk body 42 of the wire winding disk 4 so that the spiral spring 6 is connected to the wire winding disk 4. Another buckle end 62 of the spiral spring 6 is buckled to the slot 14 formed in the shaft 13 of the box body 1 so that the spiral spring 6 is further connected to the box body 1. Therefore, the spiral spring 6 is connected between the box body 1 and the wire winding disk 4. As the wire winding disk 4 rotates, the spiral spring 6 stores energy.

In order to avoid the effect of the spring tension as the communication cable 3 is pulled out, one lateral side internal the box body 1 is pivotally installed with a swingable resisting block 73, and a V shape elastic element 74 is further engaged to the box body 1 at two outer sides of the resisting block. At least one tilt buckling groove 75 and a cambered notch 76 are formed in spaced relationship at proper positions on the spring retaining post 50 of the second disk body 42. Therefore, as the communication cable 3 is pulled out, the wire winding disk 4 rotates clockwise, and the resisting block 73 is shifted rightwards to the right side of the V shape elastic element 74 due to the friction of the edge of the disk. If the wire winding disk rotates continuously, no buckling effect occurs to the buckling groove 75 and notch 76. If the pulling force is stopped at a proper timing so that the spiral spring 6 is rewound, the resisting block 73 will be embedded into the buckling groove 75 to induce an inverse buckling action. Thus, as the user pulls the communication cable 3 out with a proper length, the communication cable can be fixed instantly.

However, when the communication cable 3 is to be rewound, it is only necessary to pull the cable, so that the cambered notch 76 moves to the tip point of the resisting block 73, and the then the cable is released to be rewound, at that time the resisting block 73 will move into the notch 76 and swings leftwards due to the elastic force of the V shape elastic member 74. Then, even as it passes through the buckling groove 75 continuously, no buckling effect occurs, so that the communication cable 3 will rapidly and continuously be rewound.

Although the present invention has been described with reference to the preferred embodiments, it will be understood that the invention is not limited to the described details thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. A wire winding box comprising:

a box body having a wire groove formed therein and a shaft extending from an inner lateral side of the wire groove, the shaft having an axially extended slot formed therein and extending through the box body;

a housing being connected to the box body for enclosing the wire groove;

a wire winding disk having a first disk body and a second disk body, the first disk body having a centrally disposed axial hole and a through hole spaced therefrom, the second disk body being coupled to the first disk body and having an axial hole aligned with the axial hole of the first disk body, the first disk body having a wire winding ring formed on one side thereof and a receiving groove formed on an opposing side thereof, the wire winding disk being placed in the wire groove of the box body and the shaft extending respectively through the axial holes of the first and second disk bodies for the wire winding disk to rotate thereon;

a communication cable having one end portion passing from external the box body through the slot to wind around the shaft, and into the receiving groove of the wire winding disk, the communication cable passing through the through hole of the first disk body and being further wound on the wire winding ring of the wire winding disk;

a pair of arcuate positioning pieces extending from the inner lateral side of the wire groove adjacent a periphery of the shaft, the communication cable being captured between the shaft and at least on of the positioning pieces; and, a spiral spring being connected between the box body and the second disk body.

2. The wire winding box as claimed in claim 1, wherein the first disk body has an outer wire winding ring formed thereon and spaced from an outer periphery of the wire winding ring, the outer wire winding ring having a via hole, the communication cable being wound around the outer wire winding ring and passing through the via hole to be wound on the wire winding ring; a retaining piece being installed in the via hole for fixing the communication cable in the via hole.

3. A wire winding box comprising:

a box body having a wire groove formed therein and a shaft extending from an inner lateral side of the wire groove, the shaft having an axially extended slot formed therein and extending through the box body;

a housing being connected to the box body for enclosing the wire groove;

a wire winding disk having a first disk body and a second disk body, the first disk body having a centrally disposed axial hole and a through hole spaced therefrom, the second disk body being coupled to the first disk body and having an axial hole aligned with the axial hole of the first disk body, the first disk body having a wire winding ring formed on one side thereof and a receiving groove formed on an opposing side thereof, the wire winding disk being placed in the wire groove of the box body and the shaft extending respectively through the axial holes of the first and second disk bodies for the wire winding disk to rotate thereon, the second disk body having a spring retaining post extending therefrom, the spring retaining post having at least one buckling groove formed therein and a cambered notch angularly spaced therefrom;

a communication cable having one end portion passing from external the box body through the slot to wind around the shaft, and into the receiving groove of the wire winding disk, the communication cable passing through the through hole of the first disk body and being further wound on the wire winding ring of the wire winding disk;

a spiral spring being connected between the box body and the second disk body; and, a swingable resisting block pivotally coupled to the box body within the wire groove and a V-shaped elastic member positioned around two sides of the resisting block for providing a bias force thereto, the resisting block having a distal end in contact with the spring retaining post, whereby interaction between the resisting block, the at least one buckling groove, the cambered notch, and the V-shaped elastic member enables the communication cable to be pulled and released reciprocally to alternately fix and rewind the communication cable.

4. A wire winding box comprising:

a box body having a wire groove formed therein and a shaft extending from an inner lateral side of the wire groove, the shaft having an axially extended slot formed therein and extending through the box body, the shaft having a pair of spaced peripheral segments defining a pair of positioning pieces;

a housing being connected to the box body for enclosing the wire groove;

a wire winding disk having a first disk body and a second disk body, the first disk body having a centrally disposed axial hole and a through hole spaced therefrom, the second disk body being coupled to the first disk body and having an axial hole aligned with the axial hole of the first disk body, the first disk body having a wire winding ring formed on one side thereof and a receiving groove formed on an opposing side thereof, the wire winding disk being placed in the wire groove of the box body and the shaft extending respectively through the axial holes of the first and second disk bodies for the wire winding disk to rotate thereon;

a communication cable having one end portion passing from external the box body through the slot to wind around the shaft, the communication cable being captured by the positioning pieces and then passed into the receiving groove of the wire winding disk, the communication cable passing through the through hole of the first disk body and being further wound on the wire winding ring of the wire winding disk; and, a spiral spring being connected between the box body and the second disk body.

* * * * *